United States Patent
Kikuchi et al.

(10) Patent No.: US 10,033,289 B2
(45) Date of Patent: Jul. 24, 2018

(54) INSULATED SYNCHRONOUS RECTIFICATION DC/DC CONVERTER INCLUDING CAPACITOR AND AUXILIARY POWER SUPPLY

(71) Applicant: ROHM CO., LTD., Ukyo-Ku, Kyoto (JP)

(72) Inventors: Hiroki Kikuchi, Ukyo-Ku (JP); Ryo Shimizu, Ukyo-Ku (JP)

(73) Assignee: ROHM CO., LTD., Kyoto (JP)

(*) Notice: Subject to any disclaimer, the term of this patent is extended or adjusted under 35 U.S.C. 154(b) by 0 days.

(21) Appl. No.: 15/219,662

(22) Filed: Jul. 26, 2016

(65) Prior Publication Data
US 2017/0033703 A1 Feb. 2, 2017

(30) Foreign Application Priority Data

Jul. 30, 2015 (JP) .................. 2015-151194

(51) Int. Cl.
*H02M 3/335* (2006.01)
*H02M 1/00* (2006.01)

(52) U.S. Cl.
CPC .......... *H02M 3/33592* (2013.01); *H02M 2001/0006* (2013.01); *Y02B 70/1475* (2013.01)

(58) Field of Classification Search
CPC ...... H02M 2001/0006; H02M 3/33592; Y02B 70/1475
See application file for complete search history.

(56) References Cited

U.S. PATENT DOCUMENTS

| | | | | |
|---|---|---|---|---|
| 2006/0279967 | A1* | 12/2006 | Shao | H02M 3/33592 363/21.01 |
| 2012/0236605 | A1* | 9/2012 | Chen | H02M 3/33592 363/21.18 |
| 2014/0268915 | A1* | 9/2014 | Kong | H02M 3/33592 363/21.14 |
| 2016/0226389 | A1* | 8/2016 | Quaglino | H02M 3/33592 |

FOREIGN PATENT DOCUMENTS

JP 2010074959 A 4/2010

OTHER PUBLICATIONS

SLUA604 ("A High Efficiency Synchronous Rectifier Flyback for High Density AC/DC Adapter," Texas Instruments, Aug. 2011).*
DC968A2-C ("Isolated DC/DC Power Converter," Linear Technology, Jan. 2009).*

* cited by examiner

*Primary Examiner* — Kyle J Moody
*Assistant Examiner* — Jye-June Lee
(74) *Attorney, Agent, or Firm* — Cantor Colburn LLP

(57) ABSTRACT

A first capacitor and an auxiliary power supply are provided to a secondary side of an insulated synchronous rectification DC/DC converter, in addition to a synchronous rectification transistor and a secondary-side controller. One end of the first capacitor is connected to a first node that connects the synchronous rectification transistor and a secondary winding. The auxiliary power supply charges the first capacitor using the voltage $V_{OUT}$ supplied via the output line, so as to stabilize the voltage across the first capacitor. The ground voltage is supplied to the secondary-side controller via the first node. Furthermore, the power supply voltage is supplied to the secondary-side controller via the other end of the first capacitor.

14 Claims, 7 Drawing Sheets

INSULATED SYNCHRONOUS RECTIFICATION DC/DC CONVERTER INCLUDING CAPACITOR AND AUXILIARY POWER SUPPLY

CROSS REFERENCE TO RELATED APPLICATIONS

The present invention claims priority under 35 U.S.C. § 119 to Japanese Application No. 2015-151194 filed Jul. 30, 2015, the entire content of which is incorporated herein by reference.

BACKGROUND OF THE INVENTION

1. Field of the Invention

The present invention relates to an insulated synchronous rectification DC/DC converter.

2. Description of the Related Art

Various kinds of consumer electronics devices such as TVs, refrigerators, etc., each operate receiving commercial AC electric power from an external circuit. Also, electronic devices such as laptop computers, cellular phone terminals, and tablet terminals are each configured to operate using commercial AC electric power, and/or to be capable of charging a built-in battery using such commercial AC electric power. Such consumer electronics devices and electronic devices (which will collectively be referred to as "electronic devices" hereafter) each include a built-in power supply apparatus (AC/DC converter) that performs AC/DC conversion of commercial AC voltage. Alternatively, in some cases, such an AC/DC converter is built into an external power supply adapter (AC adapter) for such an electronic device.

FIG. 1 is a block diagram showing a basic configuration of an AC/DC converter 100r investigated by the present inventor. The AC/DC converter 100r mainly includes a filter 102, a rectifier circuit 104, a smoothing capacitor 106, and a DC/DC converter 200r.

The commercial AC voltage $V_{AC}$ is input to the filter 102 via a fuse and an input capacitor (not shown). The filter 102 removes noise included in the commercial AC voltage $V_{AC}$. The rectifier circuit 104 is configured as a diode bridge circuit which performs full-wave rectification of the commercial AC voltage $V_{AC}$. The output voltage of the rectifier circuit 104 is smoothed by the smoothing capacitor 106, thereby generating a converted DC voltage $V_{IN}$.

An insulated DC/DC converter 200r receives the DC voltage $V_{IN}$ via an input terminal P1, steps down the DC voltage $V_{IN}$ thus received so as to generate an output voltage $V_{OUT}$ stabilized to a target value, and supplies the output voltage $V_{OUT}$ thus stabilized to a load (not shown) connected between an output terminal P2 and a ground terminal P3.

The DC/DC converter 200r includes a primary-side controller 202, a photocoupler 204, a shunt regulator 206, an output circuit 210, a secondary-side controller 300r, and other circuit components. The output circuit 210 includes a transformer T1, a diode D1, an output capacitor C2, a switching transistor M1, and a synchronous rectification transistor M2. The output circuit 210 has the same topology as those of typical synchronous rectification flyback converters, and accordingly description thereof will be omitted.

The switching transistor M1 connected to the primary winding W1 of the transformer T1 performs switching so as to step down the input voltage $V_{IN}$, thereby generating the output voltage $V_{OUT}$. With such an arrangement, the primary-side controller 202 adjusts the duty ratio of the switching of the switching transistor M1.

The output voltage $V_{OUT}$ of the DC/DC converter 200r is divided by means of resistors R1 and R2. The cathode (K) terminal of the shunt regulator 206 is connected to a light-emitting element (light-emitting diode) on the input side of the photocoupler 204. The anode (A) terminal of the shunt regulator 206 is grounded. The divided voltage (voltage detection signal) $V_{OUT\_S}$ is input to a reference (REF) terminal of the shunt regulator 206. The shunt regulator 206 includes an error amplifier that amplifies the difference between the voltage detection signal $V_{OUT\_S}$ and a reference voltage $V_{REF}$ (not shown) so as to generate an error current $I_{ERR}$ that corresponds to the difference, which is drawn (as a sink current) via the light-emitting element (light-emitting diode) on the input side of the photocoupler 204.

A feedback current $I_{FB}$ flows through a light-receiving element (phototransistor) on the output side of the photocoupler 204 according to the error current $I_{ERR}$ that flows on the secondary side. The feedback current $I_{FB}$ is smoothed by means of a resistor and a capacitor, and is input to a feedback (FB) terminal of the primary-side controller 202. The primary-side controller 202 adjusts the duty ratio of the switching transistor M1 based on the voltage (feedback voltage) $V_{FB}$ at the FB terminal.

The secondary-side controller 300r switches on and off the synchronous rectification transistor M2 in synchronization with the switching of the switching transistor M1. The secondary-side controller 300r includes a synchronous rectification controller and a driver. The synchronous rectification controller generates a pulse signal in synchronization with the switching of the switching transistor M1. For example, when the switching transistor M1 turns off, the synchronous rectification controller sets the pulse signal to a first state (e.g., high level) configured as an instruction to turn on the synchronous rectification transistor M2. When a secondary-side current $I_S$ that flows through the secondary winding W2 becomes substantially zero in an on period of the synchronous rectification transistor M2, the synchronous rectification controller sets the pulse signal to a second state (low level) configured as an instruction to turn off the synchronous rectification transistor M2. The driver switches on and off the synchronous rectification transistor M2 according to this pulse signal.

In order to turn on the synchronous rectification transistor M2, there is a need to apply a gate voltage to the gate of the synchronous rectification transistor M2 that is higher than its source voltage $V_S$ by a predetermined voltage. In FIG. 1, the synchronous rectification transistor M2 is arranged on the high electric potential side of the secondary winding W2, i.e., on the output terminal P2 side. With such an arrangement, the source voltage $V_S$ of the synchronous rectification transistor M2 changes according to the switching of the switching transistor M1. With such a topology, in order to provide the switching of the synchronous rectification transistor M2, the ground (GND) terminal of the secondary-side controller 300r is connected to the source of the synchronous rectification transistor M2. With such an arrangement, the secondary-side controller 300r is required to operate with the source voltage $V_S$ as the reference voltage.

Furthermore, the secondary-side controller 300r is required to receive, via its power supply (VCC) terminal, a power supply voltage $V_{CC1}$ generated with the source voltage $V_S$ of the synchronous rectification transistor M2 as the reference voltage. In order to generate the power supply voltage $V_{CC1}$, an auxiliary winding W4 is arranged on the secondary side of the transformer T1. The auxiliary winding W4, a diode D4, and a capacitor C4 form an auxiliary converter, which generates the DC voltage $V_{CC1}$ that is higher than the output voltage $V_{OUT}$. That is to say, the DC/DC converter 200r shown in FIG. 1 requires such a transformer T1 including such an auxiliary winding W4. However, such a transformer T1 is a high-cost component.

SUMMARY OF THE INVENTION

The present invention has been made in order to solve such a problem. Accordingly, it is an exemplary purpose of an embodiment of the present invention to provide a DC/DC converter that does not require an auxiliary winding arranged on the secondary side of a transformer to supply electric power to a secondary-side controller.

An embodiment of the present invention relates to an insulated synchronous rectification DC/DC converter. The DC/DC converter comprises: a transformer comprising a primary winding and a secondary winding; an output line connected to a load; a switching transistor connected to the primary winding; a synchronous rectification transistor arranged between the secondary winding and the output line; a primary-side controller that drives the switching transistor; a secondary-side controller that drives the synchronous rectification transistor; a first capacitor having a first electrode connected to a first node that connects the secondary winding and the synchronous rectification transistor; and an auxiliary power supply that charges the first capacitor using a voltage supplied via the output line, so as to stabilize a voltage across the first capacitor. The ground voltage is supplied to the secondary-side controller via the first node. Furthermore, the power supply voltage is supplied to the secondary-side controller via a second electrode of the first capacitor.

Such an embodiment does not require an auxiliary winding to be provided on the secondary side of the transformer. This allows costs to be reduced.

Also, the auxiliary power supply may comprise a first resistor arranged between the output line and the second electrode of the first capacitor. Such an arrangement allows the first capacitor to be charged via the first resistor.

Also, the auxiliary power supply may further comprise a diode arranged in series with the first resistor between the output line and the second electrode of the first capacitor such that a cathode of the diode is oriented toward the first capacitor side.

The voltage at the first node rises according to the switching of the switching transistor M1. In some cases, this leads to a problem in that the voltage at the second electrode of the first capacitor becomes higher than the voltage at the output line. By providing a diode to the charging path, such an arrangement is capable of preventing the first capacitor from discharging, thereby maintaining the voltage across the first capacitor.

Also, the auxiliary power supply may comprise a diode arranged between the output line and the second electrode of the first capacitor such that a cathode of the diode is oriented toward the first capacitor side.

Also, the auxiliary power supply may comprise a clamp circuit that clamps a voltage across the first capacitor such that it does not exceed a predetermined voltage. This allows the voltage across the first capacitor to be stabilized.

Also, the auxiliary power supply may comprise a transistor arranged between the output line and the second electrode of the first capacitor such that a source or otherwise an emitter of the transistor is connected to the second electrode of the first capacitor, and such that a constant voltage is input to a gate or otherwise a base of the transistor. In this case, with the constant voltage as $V_A$, and with the gate-source voltage (base-emitter voltage) of the transistor as $V_B$, such an arrangement is capable of stabilizing the voltage across the first capacitor to $(V_A-V_B)$.

Also, the auxiliary power supply may further comprise a first Zener diode arranged between the first electrode of the first capacitor and the gate or otherwise the base of the transistor.

Also, the auxiliary power supply may comprise a second Zener diode connected in parallel with the first capacitor. This allows the voltage across the first capacitor to be stabilized to the Zener voltage of the second Zener diode.

Also, the auxiliary power supply may comprise: a charger circuit arranged between the output line and the first capacitor such that a current flows from the output line to the first capacitor while a current flow in a reverse direction is prevented; and a clamp circuit that stabilizes a voltage across the first capacitor.

Also, at least a part of the auxiliary power supply and the secondary-side controller may be packaged in the form of a single module.

Another embodiment of the present invention also relates to an insulated synchronous rectification DC/DC converter. The DC/DC converter comprises: a transformer comprising a primary winding and a secondary winding; an output line connected to a load; a switching transistor connected to the primary winding; a synchronous rectification transistor arranged between the secondary winding and the output line; a primary-side controller that drives the switching transistor; a secondary-side controller that drives the synchronous rectification transistor; a first capacitor having a first electrode connected to a first node that connects the secondary winding and the synchronous rectification transistor; a transistor arranged such that a source or otherwise an emitter of the transistor is connected to a second electrode of the first capacitor; a first resistor and a diode arranged in series between the output line and a drain or otherwise a collector of the transistor; a first Zener diode arranged such that a cathode thereof is connected to a gate or otherwise a base of the transistor, and such that an anode thereof is connected to the first electrode of the first capacitor; and a second resistor arranged between the output line and the gate or otherwise the base of the transistor. The ground voltage is supplied to the secondary-side controller via the first node. Furthermore, the power supply voltage is supplied to the secondary-side controller via a second electrode of the first capacitor.

Yet another embodiment of the present invention also relates to a DC/DC converter. The DC/DC converter comprises: a transformer comprising a primary winding and a secondary winding; an output line connected to a load; a switching transistor connected to the primary winding; a synchronous rectification transistor arranged between the secondary winding and the output line; a primary-side controller that drives the switching transistor; a secondary-side controller that drives the synchronous rectification transistor; a first capacitor having a first electrode connected to a first node that connects the secondary winding and the synchronous rectification transistor; a transistor arranged such that a source or otherwise an emitter of the transistor is connected to a second electrode of the first capacitor; a first resistor and a diode arranged in series between the output line and a drain or otherwise a collector of the transistor; and a second Zener diode arranged such that a cathode thereof is connected to the second electrode of the first capacitor, and such that an anode thereof is connected to the first electrode of the first capacitor. The ground voltage is supplied to the secondary-side controller via the first node. Furthermore, the power supply voltage is supplied to the secondary-side controller via a second electrode of the first capacitor.

With an embodiment, the DC/DC converter may further comprise: a feedback photocoupler; and a shunt regulator that is connected to an input side of the feedback photocoupler, and that generates an error current that corresponds to an output voltage of the DC/DC converter. The primary-side controller may be connected to an output side of the feedback photocoupler. Also, the primary-side controller may drive the switching transistor according to a feedback signal received from the feedback photocoupler.

Also, the DC/DC converter may further comprise a second capacitor connected to the output line.

Yet another embodiment of the present invention relates to a power supply apparatus (AC/DC converter). The power supply apparatus comprises: a filter that filters a commercial AC voltage; a diode rectifier circuit that full-wave rectifies an output voltage of the filter; a smoothing capacitor that smoothes an output voltage of the diode rectifier circuit so as to generate a DC input voltage; and the aforementioned DC/DC converter that steps down the DC input voltage, and that supplies the DC input voltage thus stepped down to a load.

Yet another embodiment of the present invention relates to an electronic device. The electronic device comprises: a load; a filter that filters a commercial AC voltage; a diode rectifier circuit that full-wave rectifies an output voltage of the filter; a smoothing capacitor that smoothes an output voltage of the diode rectifier circuit so as to generate a DC input voltage; and the aforementioned DC/DC converter that steps down the DC input voltage, and that supplies the DC input voltage thus stepped down to the load.

Yet another embodiment of the present invention relates to an AC adapter. The AC adapter comprises: a filter that filters a commercial AC voltage; a diode rectifier circuit that full-wave rectifies an output voltage of the filter; a smoothing capacitor that smoothes an output voltage of the diode rectifier circuit so as to generate a DC input voltage; the aforementioned DC/DC converter that steps down the DC input voltage so as to generate a DC output voltage.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 1:
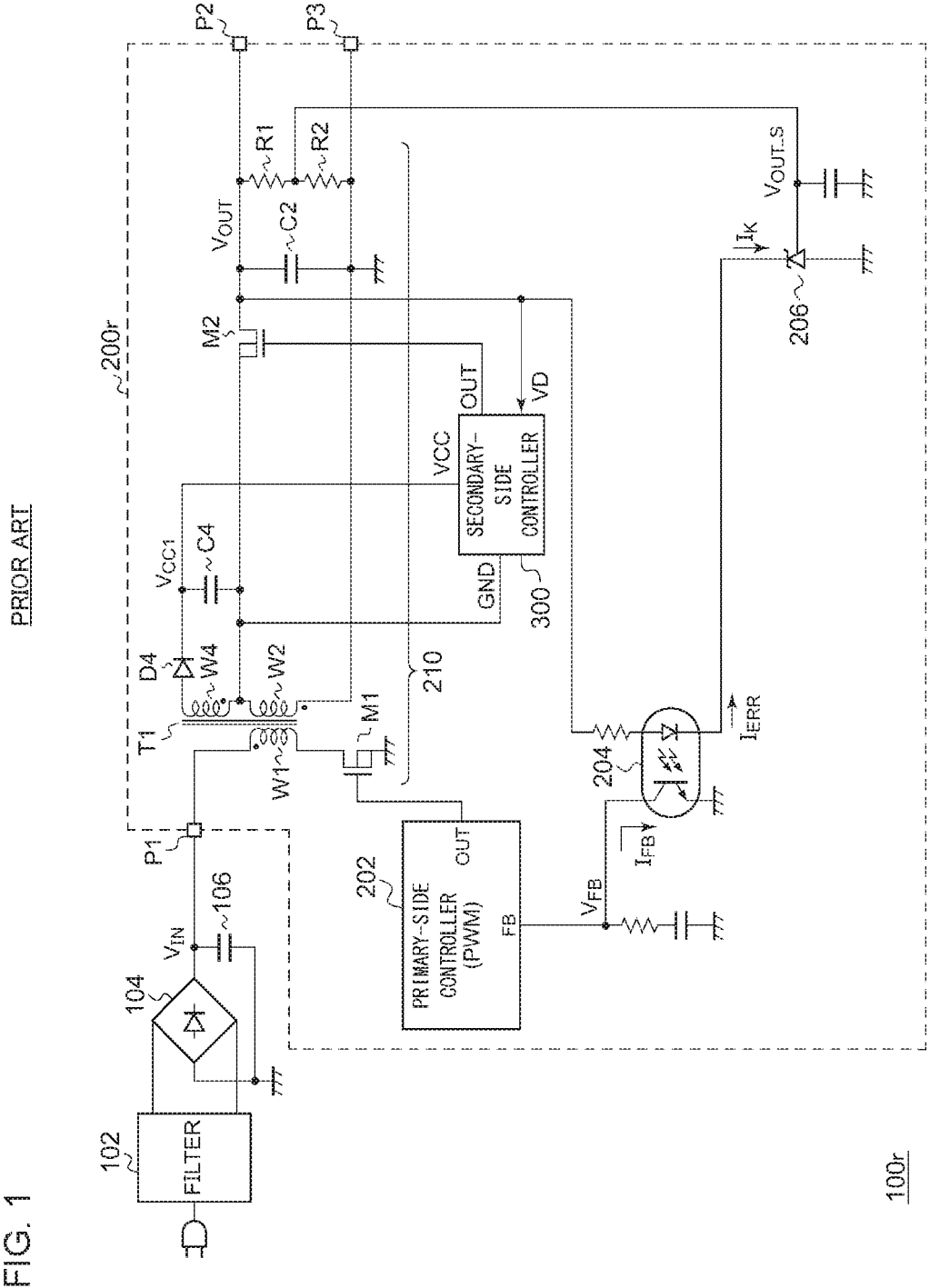
FIG. 1 is a block diagram showing a basic configuration of an AC/DC converter investigated by the present inventor.
Figure 2:
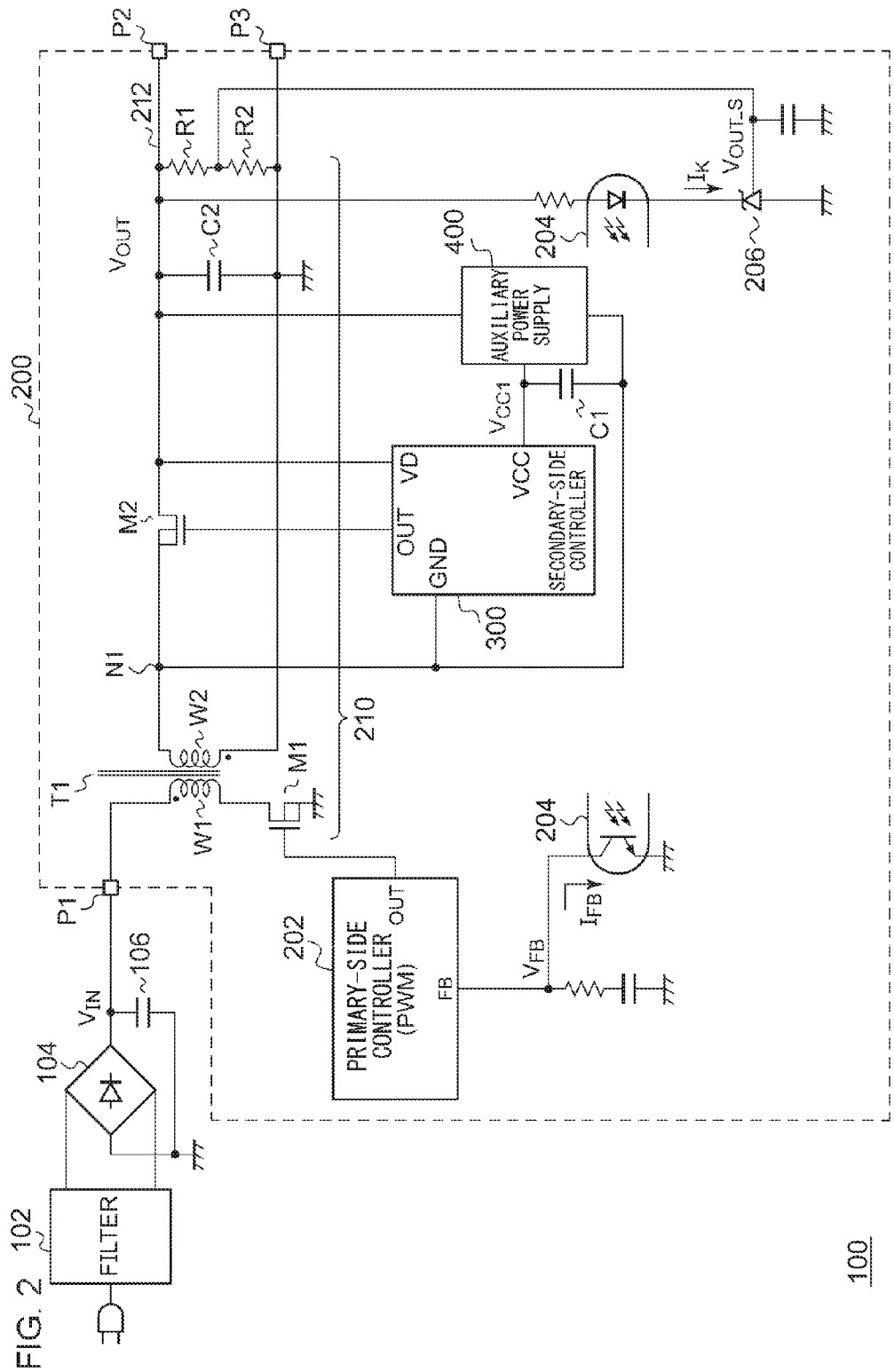
FIG. 2 is a circuit diagram showing an AC/DC converter including an insulated synchronous rectification DC/DC converter according to an embodiment.

FIG. 2 is a circuit diagram showing an AC/DC converter 100 including an insulated synchronous rectification DC/DC converter 200 according to an embodiment. The AC/DC converter 100 has the same basic configuration as that shown in FIG. 1. Also, the DC/DC converter 200 has the same basic configuration as that shown in FIG. 1.

The configuration and the operation of the secondary-side controller 300 are not restricted in particular. Rather, known techniques or techniques that will become available in the future may be employed. For example, when the secondary-side controller 300 detects the turn-off of the switching transistor M1 arranged on the primary side of the DC/DC converter 200, the secondary-side controller 300 turns on the synchronous rectification transistor M2. When the secondary-side controller 300 detects that the current $I_S$ that flows through the secondary winding W2 of the transformer T1 becomes substantially zero, the secondary-side controller 300 turns off the synchronous rectification transistor M2.

In the on period of the switching transistor M1, the voltage across the secondary winding W2 is represented by $-V_{IN} \times N_S/N_P$. Thus, the drain voltage $V_{D\_S}$ (i.e., drain-source voltage $V_{DS}$) of the synchronous rectification transistor M2 is represented by $V_{D\_S} = V_{OUT} + V_{IN} \times N_S/N_P$. Here, $N_P$ and $N_S$ represent the number of turns of the primary winding W1 and the number of turns of the secondary winding W2, respectively.

When the switching transistor M1 is turned off, the secondary current $I_S$ flows from the source toward the drain of the synchronous rectification transistor M2. In this state, the drain-source voltage becomes a negative voltage. In the continuous mode, when the switching transistor M1 is turned on, the secondary current $I_S$ becomes 0. In this state, the drain voltage again rises to a voltage as represented by $V_D = V_{OUT} + V_{IN} \times N_S/N_P$. In the discontinuous mode, when the synchronous rectification transistor M2 is turned on, the secondary current $I_S$ decreases according to a decrease in the energy stored in the transformer T1. Also, the absolute value of the drain-source voltage $V_{DS}$ decreases according to a decrease in the secondary current $I_S$. When the secondary current $I_S$ becomes substantially zero, the drain-source voltage $V_{DS}$ becomes substantially zero. In this state, ringing occurs in the drain voltage $V_{D\_S}$.

With such a mechanism, the secondary-side controller 300 is capable of switching on and off the synchronous rectification transistor M2 according to the drain voltage (drain-source voltage) of the synchronous rectification transistor M2.

In the present embodiment, electric power is supplied to the secondary-side controller 300 in a different manner from that shown in FIG. 1. Specifically, in order to supply the power supply voltage $V_{CC1}$ to the secondary-side controller 300, a first capacitor C1 and an auxiliary power supply 400 are provided. One end (first electrode) of the first capacitor C1 is connected to a first node N1 that connects the secondary winding W2 and the synchronous rectification transistor M2 (i.e., the source of the synchronous rectification transistor M2).

The auxiliary power supply 400 is connected to the first capacitor C1 and an output line 212. The auxiliary power supply 400 charges the first capacitor C1 using the voltage $V_{OUT}$ supplied via the output line 212. Furthermore, the auxiliary power supply 400 stabilizes the voltage across the first capacitor C1.

The GND terminal of the secondary-side controller 300 is connected to the first node N1. The VCC terminal of the secondary-side controller 300 is connected to the other end (second electrode) of the first capacitor C1. With such an arrangement, the ground voltage is supplied to the secondary-side controller 300 from the first node N1. Furthermore, the power supply voltage $V_{CC1}$ is supplied to the secondary-side controller 300 from the second electrode of the first capacitor C1.

The present invention encompasses various kinds of apparatuses and circuits that can be regarded as a block configuration or a circuit configuration shown in FIG. 2, or otherwise that can be derived from the aforementioned description. That is to say, the present invention is not restricted to a specific circuit configuration. More specific description will be made below regarding an example configuration for clarification and ease of understanding of the essence of the present invention and the circuit operation. That is to say, the following description will by no means be intended to restrict the technical scope of the present invention.

Figure 3:
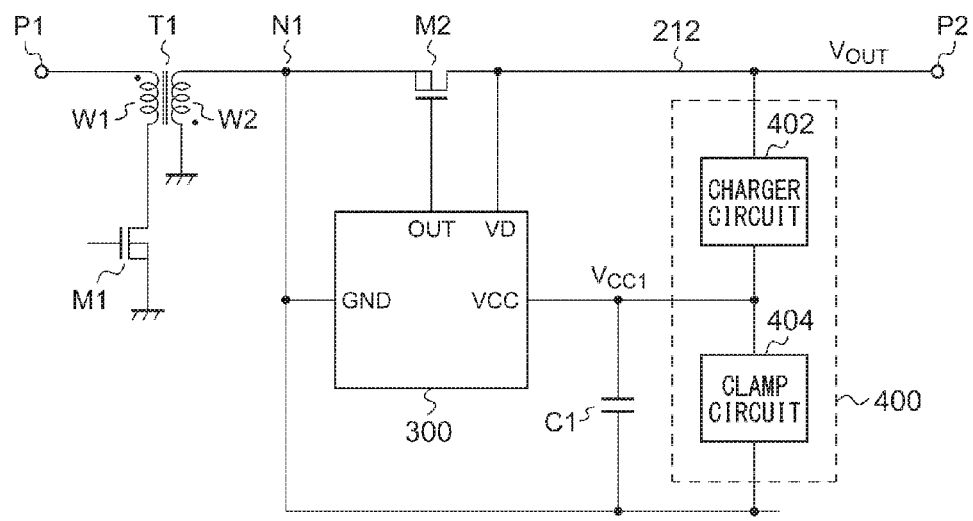
FIG. 3 is a circuit diagram showing an example configuration of an auxiliary power supply.

FIG. 3 is a circuit diagram showing an example configuration of the auxiliary power supply 400. The auxiliary power supply 400 includes a charger circuit 402 and a clamp circuit 404. The charger circuit 402 is arranged between the output line 212 and the second electrode of the first capacitor C1 such that a current flows from the output line 212 toward the first capacitor C1 while a current flow in a reverse direction is prevented. The clamp circuit 404 stabilizes the voltage across the first capacitor C1.

Figure 4:
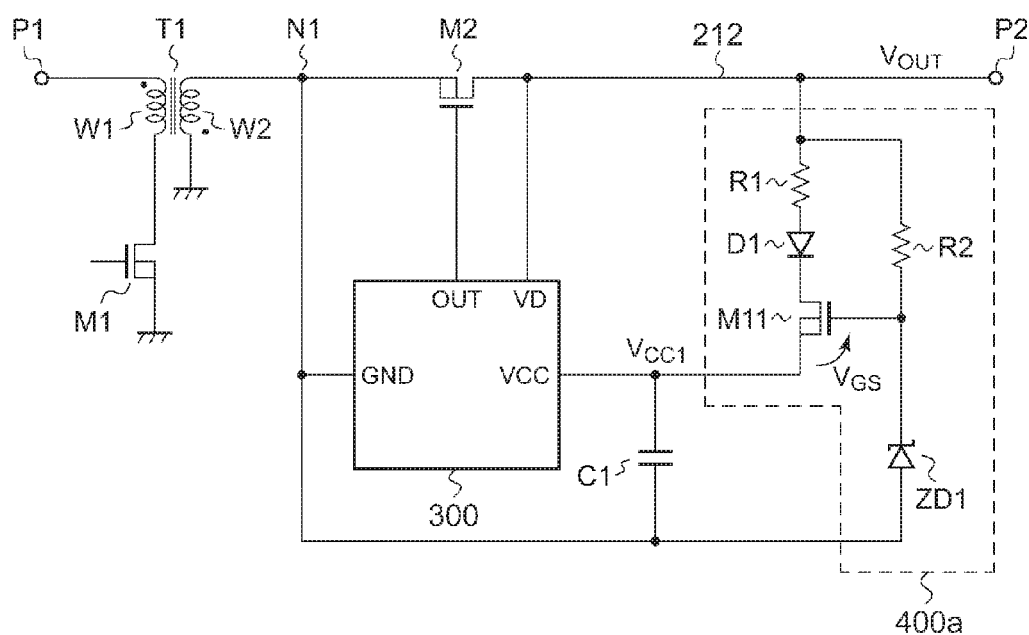
FIG. 4 is another circuit diagram showing an example configuration of an auxiliary power supply.

FIG. 4 is another circuit diagram showing an auxiliary power supply 400a. The auxiliary power supply 400a includes a first resistor R1, a diode D1, a transistor M11, a second resistor R2, and a first Zener diode ZD1. The transistor M11 is configured as an N-channel MOSFET (Metal Oxide Semiconductor Field Effect Transistor). The transistor M11 is arranged such that its source is connected to the second electrode of the first capacitor C1. The first resistor R1 and the diode D1 are arranged in series between the output line 212 and the drain of the transistor M1. The first Zener diode ZD1 is arranged such that its cathode is connected to the gate of the transistor M11 and its anode is connected to the first electrode of the first capacitor C1. The second resistor R2 is arranged between the output line 212 and the gate of the transistor M11.

The first capacitor C1 is charged via a path including the first resistor R1, the diode D1, and the transistor M11. With the Zener voltage of the first Zener diode ZD1 as $V_Z$, the voltage across the first capacitor C1 is clamped such that it does not exceed $(V_Z-V_{GS})$. Here, $V_{GS}$ represents the gate-source voltage of the transistor M11. The diode D1 prevents a flow of current from the first capacitor C1 to the output line 212 via a body diode of the transistor M11.

It can be understood that a combination of the first transistor R1, the diode D1, and the transistor M11 corresponds to the charger circuit 402 shown in FIG. 3. Also, it can be understood that a combination of the second resistor R2, the first Zener diode ZD1, and the transistor M11 corresponds to the clamp circuit 404 shown in FIG. 3.

The first resistor R1 shown in FIG. 4 may be omitted. Also, a different kind of constant voltage element may be provided instead of the first Zener diode ZD1. For example, as such a constant voltage element, a configuration may be employed in which multiple diodes are arranged in series such that their anodes are oriented toward the gate side of the transistor M11.

The transistor M11 may be configured as an NPN bipolar transistor. With such an arrangement, there is no body diode such as that in a MOSFET. Thus, the diode D1 may be omitted.

Figure 5:
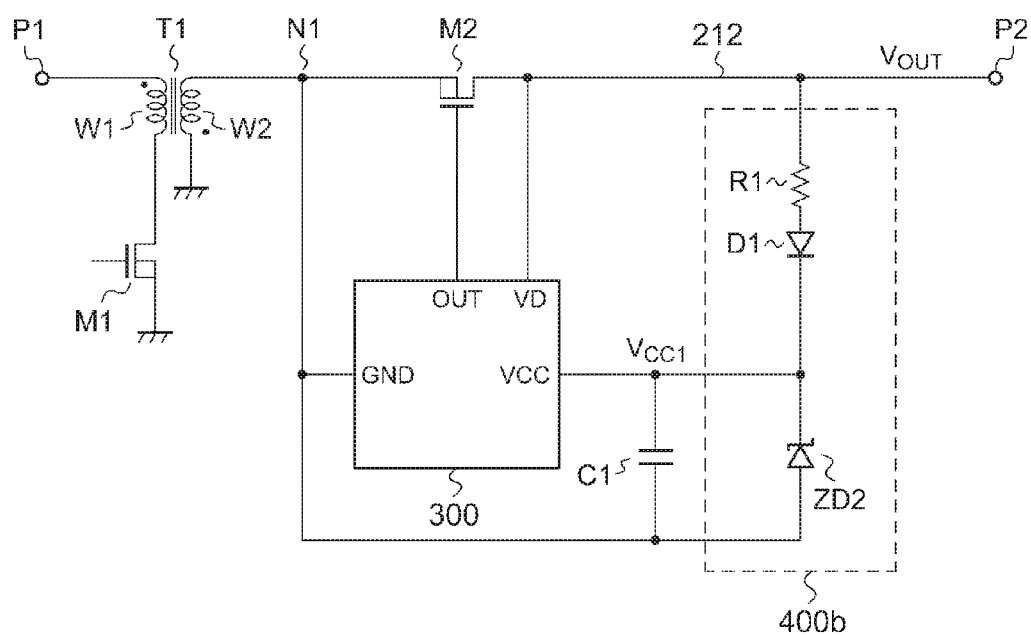
FIG. 5 is yet another circuit diagram showing an example configuration of an auxiliary power supply.

FIG. 5 is yet another circuit diagram showing an auxiliary power supply 400b. The auxiliary power supply 400b includes a first resistor R1, a diode D1, and a second Zener diode ZD2. The first resistor R1 and the diode D1 are arranged in series between the second electrode of the first capacitor C1 and the output line 212. The second Zener diode ZD2 is connected in parallel with the first capacitor C1.

The first capacitor C1 is charged via a path including the first resistor R1 and the diode D1. With such an arrangement, the voltage across the first capacitor C1 is clamped such that it does not exceed the Zener voltage $V_Z$ of the second Zener diode ZD2. It can be understood that such a combination of the first resistor R1 and the diode D1 corresponds to the charger circuit 402 shown in FIG. 3. Also, it can be understood that the second Zener diode ZD2 corresponds to the clamp circuit 404 shown in FIG. 3.

With the DC/DC converters 200 shown in FIGS. 2 through 5, such an arrangement does not require an auxiliary winding provided on the secondary side of the transformer T1. This allows costs to be reduced.

By employing a high breakdown voltage process, such an arrangement allows the circuit elements such as the first resistor R1, the diode D1, the second Zener diode ZD2, etc., to be integrated on a semiconductor substrate. Thus, at least a part of the auxiliary power supply 400 and the secondary-side controller 300 may be packaged in the form of a single module. This allows the number of components to be reduced as compared with an arrangement in which all the circuit elements of the auxiliary power supply 400 are configured as discrete elements, thereby further reducing costs.

[Usage]

Next, description will be made regarding the usage of the DC/DC converter 200 described in the embodiment.

Figure 6:
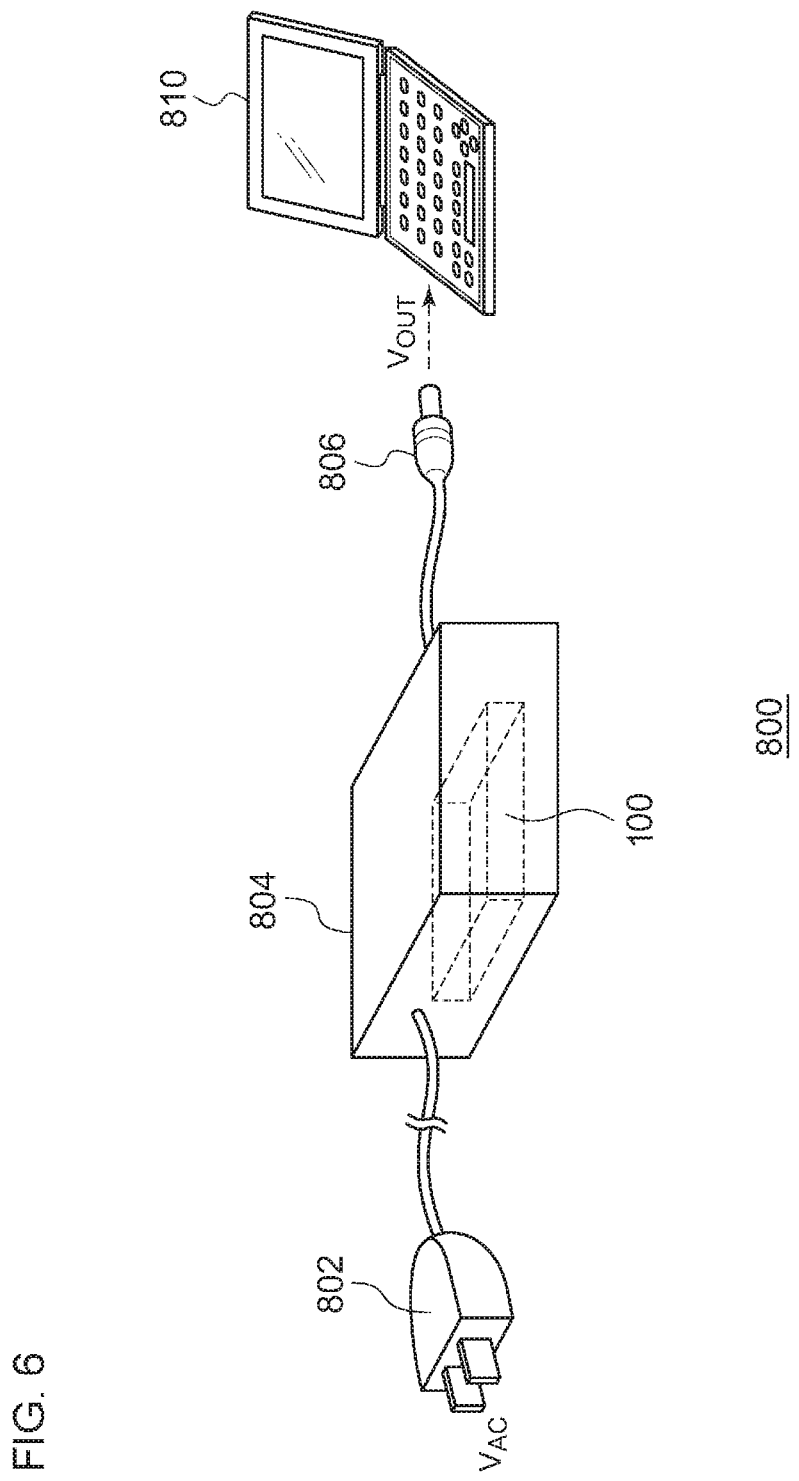
FIG. 6 is a diagram showing an AC adapter including an AC/DC converter.

FIG. 6 is a diagram showing an AC adapter 800 including the AC/DC converter 100. The AC adapter 800 includes a plug 802, a housing 804, and a connector 806. The plug 802 receives a commercial AC voltage $V_{AC}$ from an unshown electrical outlet. The AC/DC converter 100 is mounted within the housing 804. The DC output voltage $V_{OUT}$ generated by the AC/DC converter 100 is supplied from the connector 806 to an electronic device 810. Examples of such an electronic device 810 include laptop PCs, digital still cameras, digital video cameras, cellular phones, portable audio players, and the like.

Figure 7A:
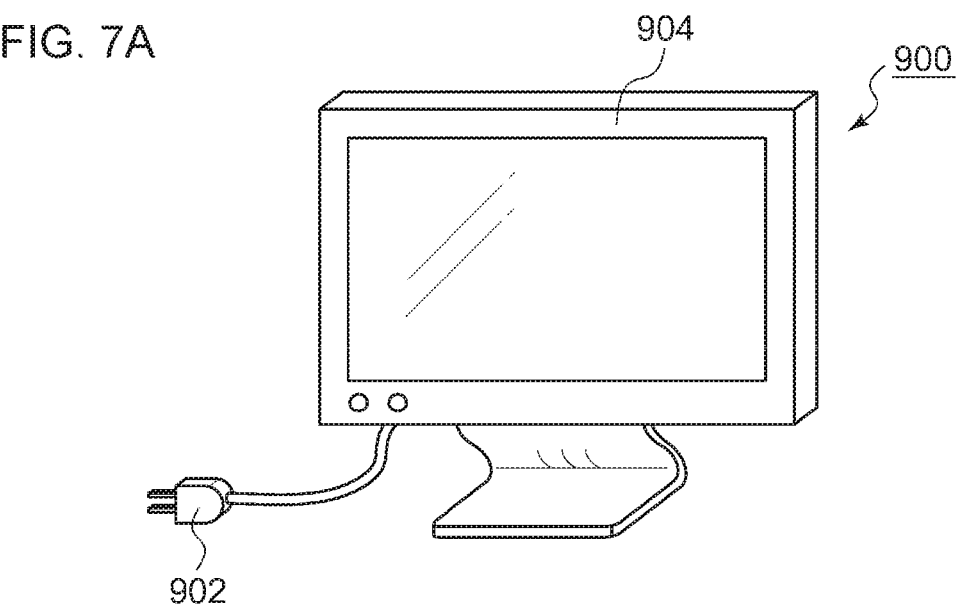
FIGS. 7A and 7B are diagrams each showing an electronic device including an AC/DC converter.
Figure 7B:
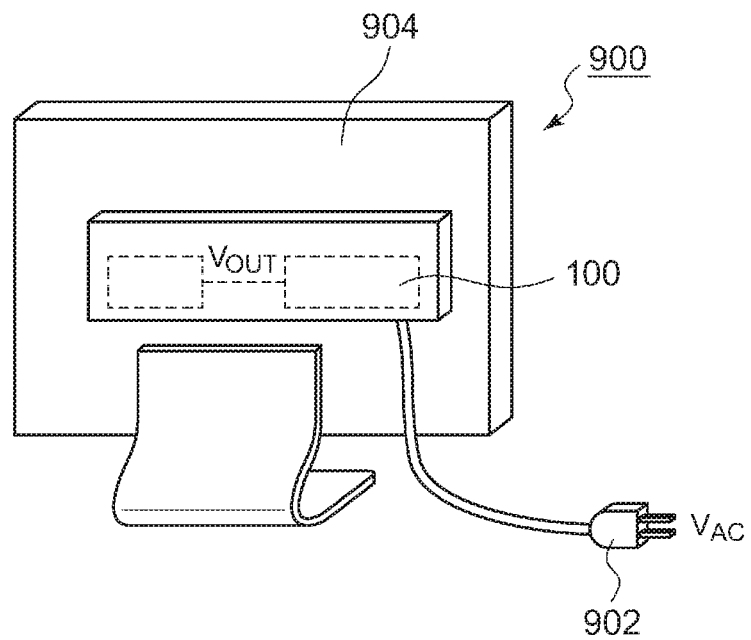

FIGS. 7A and 7B are diagrams each showing an electronic device 900 including the AC/DC converter 100. The electronic devices 900 shown in FIGS. 7A and 7B are each configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc.

A plug 902 receives commercial AC voltage $V_{AC}$ from an unshown electrical outlet. The AC/DC converter 100 is mounted within the housing 904. The DC output voltage $V_{OUT}$ generated by the AC/DC converter 100 is supplied to loads mounted within the same housing 904, examples of which include a microcomputer, DSP (Digital Signal Processor), power supply circuit, illumination device, analog circuit, digital circuit, etc.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

Description has been made in the embodiment regarding a flyback converter. Also, the present invention is applicable to a forward converter. In this case, multiple synchronous rectification transistors are arranged on the secondary side of the transformer T1. The secondary-side controller may be configured to switch on and off the multiple synchronous rectification transistors. Also, such a converter may be configured as a quasi-resonant converter.

Second Modification

At least one of the switching transistor or the synchronous rectification transistor may be configured as a bipolar transistor or an IGBT.

While the preferred embodiments of the present invention have been described using specific terms, such description is for illustrative purposes only, and it is to be understood that changes and variations may be made without departing from the spirit or scope of the appended claims.

What is claimed is:

1. A DC/DC converter configured as an insulated synchronous rectification DC/DC converter, the DC/DC converter comprising:
   a transformer comprising a primary winding and a secondary winding;
   an output line connected to a load;
   a switching transistor connected to the primary winding;
   a synchronous rectification transistor arranged between the secondary winding and the output line;
   a primary-side controller that drives the switching transistor;
   a secondary-side controller that drives the synchronous rectification transistor;
   a first capacitor having a first electrode connected to a first node that connects the secondary winding and the synchronous rectification transistor; and
   an auxiliary power supply that charges the first capacitor using a voltage supplied via the output line, so as to stabilize a voltage across the first capacitor,
   wherein the auxiliary power supply further includes:
   a first resistor having a first electrode directly connected to the output line,
   a first diode having an anode connected to a second electrode of the first resistor,
   a second resistor having a first electrode connected to the output line,
   a Zener diode having a cathode connected to a second electrode of the second resistor and an anode connected to the first electrode of the first capacitor,
   a transistor having a drain connected to a cathode of the first diode, a source connected to a second electrode of the first capacitor, and a gate connected to the second electrode of the second resistor and the cathode of the Zener diode,
   wherein a ground voltage is supplied to the secondary-side controller via the first node,
   and wherein a power supply voltage is supplied to the secondary-side controller via the second electrode of the first capacitor.

2. The DC/DC converter according to claim 1, wherein at least a part of the auxiliary power supply and the secondary-side controller are packaged in the form of a single module.

3. The DC/DC converter according to claim 1, further comprising:
   a feedback photocoupler; and
   a shunt regulator that is connected to an input side of the feedback photocoupler, and that generates an error current that corresponds to an output voltage of the DC/DC converter,
   wherein the primary-side controller is connected to an output side of the feedback photocoupler,
   and wherein the primary-side controller drives the switching transistor according to a feedback signal received from the feedback photocoupler.

4. The DC/DC converter according to claim 1, further comprising a second capacitor connected to the output line.

5. A power supply apparatus comprising:
   a filter that filters a commercial AC voltage;
   a diode rectifier circuit that full-wave rectifies an output voltage of the filter;
   a smoothing capacitor that smoothes an output voltage of the diode rectifier circuit so as to generate a DC input voltage; and
   the DC converter according to claim 1, that steps down the DC input voltage, and that supplies the DC input voltage thus stepped down to the load.

6. An electronic device comprising:
   the load;
   a filter that filters a commercial AC voltage;
   a diode rectifier circuit that full-wave rectifies an output voltage of the filter;
   a smoothing capacitor that smoothes an output voltage of the diode rectifier circuit so as to generate a DC input voltage; and the DC converter according to claim 1, that steps down the DC input voltage, and that supplies the DC input voltage thus stepped down to the load.

7. A power supply adapter comprising:
a filter that filters a commercial AC voltage;
a diode rectifier circuit that full-wave rectifies an output voltage of the filter;
a smoothing capacitor that smoothes an output voltage of the diode rectifier circuit so as to generate a DC input voltage; and
the DC converter according to claim 1, that steps down the DC input voltage, and that supplies the DC input voltage thus stepped down to the load.

8. A DC/DC converter configured as an insulated synchronous rectification DC/DC converter, the DC/DC converter comprising:
a transformer comprising a primary winding and a secondary winding;
an output line connected to a load;
a switching transistor connected to the primary winding;
a synchronous rectification transistor arranged between the secondary winding and the output line;
a primary-side controller that drives the switching transistor;
a secondary-side controller that drives the synchronous rectification transistor;
a first capacitor having a first electrode connected to a first node that connects the secondary winding and the synchronous rectification transistor; and
an auxiliary power supply that charges the first capacitor using a voltage supplied via the output line, so as to stabilize a voltage across the first capacitor,
wherein the auxiliary power supply further includes:
a first resistor having a first electrode connected to the output line,
a first diode having an anode connected to a second electrode of the first resistor and cathode connected to the second electrode of the first capacitor,
a Zener diode having a cathode connected to a cathode of the first diode and the second electrode of the first capacitor, and an anode connected to the first electrode of the first capacitor,
wherein a ground voltage is supplied to the secondary-side controller via the first node,
and wherein a power supply voltage is supplied to the secondary-side controller via the second electrode of the first capacitor.

9. The DC/DC converter according to claim 8, wherein at least a part of the auxiliary power supply and the secondary-side controller are packaged in the form of a single module.

10. The DC/DC converter according to claim 8, further comprising:
a feedback photocoupler; and
a shunt regulator that is connected to an input side of the feedback photocoupler, and that generates an error current that corresponds to an output voltage of the DC/DC converter,
wherein the primary-side controller is connected to an output side of the feedback photocoupler,
and wherein the primary-side controller drives the switching transistor according to a feedback signal received from the feedback photocoupler.

11. The DC/DC converter according to claim 8, further comprising a second capacitor connected to the output line.

12. A power supply apparatus comprising:
a filter that filters a commercial AC voltage;
a diode rectifier circuit that full-wave rectifies an output voltage of the filter;
a smoothing capacitor that smoothes an output voltage of the diode rectifier circuit so as to generate a DC input voltage; and
the DC converter according to claim 8, that steps down the DC input voltage, and that supplies the DC input voltage thus stepped down to the load.

13. An electronic device comprising:
the load;
a filter that filters a commercial AC voltage;
a diode rectifier circuit that full-wave rectifies an output voltage of the filter;
a smoothing capacitor that smoothes an output voltage of the diode rectifier circuit so as to generate a DC input voltage; and
the DC converter according to claim 8, that steps down the DC input voltage, and that supplies the DC input voltage thus stepped down to the load.

14. A power supply adapter comprising:
a filter that filters a commercial AC voltage;
a diode rectifier circuit that full-wave rectifies an output voltage of the filter;
a smoothing capacitor that smoothes an output voltage of the diode rectifier circuit so as to generate a DC input voltage; and
the DC converter according to claim 8, that steps down the DC input voltage, and that supplies the DC input voltage thus stepped down to the load.

\* \* \* \* \*